UNITED STATES PATENT OFFICE 1,937,063

ARTIFICIAL RESINS DERIVED FROM MIXTURES OF OLEFINE BENZENES OR NAPHTHALENES AND UNSATURATED KETONES

Kurt Meisenburg, Leverkusen-I. G. Werk, and Walter Bock and Otto Bächle, Cologne-Mulheim, Germany, assignors to I. G. Farbenindustrie Aktiengesellschaft, Frankfort-on-the-Main, Germany No Drawing. Application April 20, 1932, Serial No. 606,512, and in Germany February 9, 1931

10 Claims. (Cl. 260—2)

The present invention relates to a process of preparing artificial resins from mixtures of olefine benzene or—naphthalenes and unsaturated ketones and to the new artificial resins obtainable by said process.

In accordance with the present invention new artificial resins are obtained by effecting polymerization of mono- or polyolefinebenzenes or naphthalene or homologues thereof in admixture with unsaturated ketones of the general formula:—

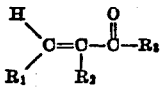

wherein $R_1$ denotes hydrogen or an alkyl group or an aryl group of the benzene series, $R_2$ means hydrogen or an alkyl group and $R_3$ an alkyl group or an aryl group of the benzene series. The amount of the constituents of the mixture to be polymerized may vary within the widest limits. Generally, the best results, in view of the properties of the artificial resins, are obtained, when applying a mixture of about equal parts by weight of the ketone and of the olefine benzene or— naphthalene. Polymerization of the mixtures may be effected according to any desired method, for example, by causing the mixture to stand for a prolonged time or by heating the mixture, preferably to a temperature between about 50–120° C., or by polymerizing the mixture in emulsion with water and an agent possessing emulsifying properties, such as water soluble salts of higher fatty acids, for example, sodium oleate, potassium stearate, alkali metal or ammonium salts of cholic acid, desoxycholic acid, alkylated naphthalene sulfonic acids, such as isopropyl- or isobutyl-naphthalene sulfonic acids, salts of organic bases with organic or inorganic acids possessing emulsifying properties, such as diethylamino-ethoxy-oleylanilide chlorohydrate or -acetate, the methylamine salt of oleic acid or cholic acid, the chlorohydrate of $\mu$-pentadecylglyoxalidine, albumin, casein, blood serum, etc. Also in this case heating of the emulsion to about 30–120° C. or even up to 150° C. will be of advantage to accelerate the polymerization process. A preferred temperature range is that between about 40–80° C. The emulsion may be homogenized before the polymerization. Obviously, ingredients known to favorably influence polymerization processes, such as oxygen, substances splitting off oxygen during polymerization, electrolytes, etc., may be added to the mixture to be polymerized before or during the polymerization.

Other variations in the polymerization process may also be applied. For example, polymerization may be performed at lower temperatures at the beginning of the polymerization process and finished at higher temperatures or vice versa. Furthermore, the polymerization process may be interrupted as soon as resin-like products have formed and before polymerization is complete. By such variations it is possible to obtain artificial resins of different properties as regards their solubility in organic solvents, the viscosity of their solutions, etc. Obviously, the properties of the artificial resins are likewise dependent on the amount and type of the polymerizable compounds contained in the polymerization mixture. Mixtures of one or several different unsaturated ketones of the formula given above with one or several different olefine benzenes or naphthalenes may be subjected to polymerization with the effect that artificial resins of the most various properties are obtained.

Finally, it may be mentioned that the exposure of the polymerization mixture to light during the polymerization has a remarkable effect as well on the speed of the polymerization process as on the properties of the polymerizates obtained.

As to the more specific properties of our new resins the following may be mentioned:—

Generally, the new resins form colorless to weakly colored products, which differ to a far reaching extent from the resins which are obtained by polymerizing ketones of the formula given or olefine benzenes or—naphthalenes alone. The ketone resins are generally rather difficultly soluble in benzene, furthermore, they are rather unstable towards water and light and are not suitable for electrical insulating purposes. Olefine benzene or—naphthalene resins on the other hand, generally do not possess the disadvantages of the ketone resins above mentioned, but they are usually rather brittle. It is one object of the present invention to have found that our new resins generally combine the good properties possessed by the ketone or olefine benzene or -naphthalene resins respectively, without possessing the disadvantages of the said resins. Therefore, the new resins are generally more soluble and more stable to water and light than the corresponding ketone resins and are simultaneously substantially more tough and elastic than, for example, styrene resins. Furthermore, the new resins are valuable media for electrical insulating purposes. The best resins for lacquer purposes are obtained, when performing the polymerization process by heating the mixtures to be polymerized to rather high temperatures, (say about 60-80° C. or more), whereas at lower temperatures artificial resins are obtained, which are especially suitable for the manufacture of pressed articles etc.

The following examples illustrate our invention, without, however, limiting it thereto, the parts being by weight:—

Example 1

A mixture of 25 parts of methylene ethylmethylketone and 25 parts of styrene is emulsified with 50 parts of a 3% aqueous solution of the hydrochloride of diethylamino-ethoxy-oleylanilide. The emulsion is shaken for 2 days at 60° C. An ointment-like mass is obtained, from which the mixed resin is precipitated in powder form by means of ammonia. By extracting with alcohol or by digesting with dilute hydrochloric acid the emulsifying agent still present in the resin may be removed. The new resin thus obtained possesses technical valuable properties and is soluble in benzene in contradistinction to the resin obtainable by polymerizing methylene ethylmethylketone.

Example 2

A mixture of 75 parts of methylene methylethylketone and 75 parts of styrene is saturated with oxygen, while cooling with ice. The mixture is then polymerized by heating for 8 days at 60° C. and then for three days at 100-110° C. In a quantitative yield a yellowish, transparent resin is thus obtained, which is considerably more elastic than the known styrene resins, and which is easily soluble in acetone, benzene, methylene chloride, ethylacetate and cyclohexanone. The new resin possesses good resistance to water.

Example 3

A mixture of 100 parts of styrene and 25 parts of vinylmethylketone is emulsified with a solution of 7 parts of diethylamino ethoxyoleylanilide chlorohydrate and 1 part of trichloroacetic acid in 130 parts of water at 60° C. and then polymerized for 4-5 days. The polymerization product is thus obtained in a pasty form and yields after working up in the usual manner a tenacious and not brittle resin of technically valuable properties.

Example 4

A mixture of 50 parts of vinylmethylketone and 50 parts of styrene is polymerized for 8 days at 80° C. A colorless resin is obtained in a quantitative yield, which is soluble in benzene, and chloroform. The new resin shows good stability towards heat and is more elastic than the pure styrene resin.

Instead of the styrene mentioned in the above examples, alpha-alkylstyrenes (alpha-methylstyrene, for example), divinylbenzene, vinylnaphthalenes, such as alpha-vinylnaphthalene, vinylmethylnaphthalenes etc. may be applied with a good result.

It should be pointed out that the resins described can only be obtained by polymerizing mixtures of the ketones and olefine benzenes or—naphthalenes in question and that resins of substantially inferior properties are obtained, when mixing resins of separately polymerized ketones and olefine hydrocarbons as mentioned.

We claim:—

1. The process which comprises polymerizing a mixture of a compound of the group consisting of olefine benzenes and—naphthalenes and homologues thereof, and of a ketone of the probable formula:—

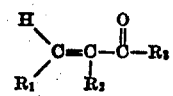

wherein $R_1$ means hydrogen, alkyl or an aryl group of the benzene series, $R_2$ means hydrogen ar alkyl and $R_3$ alkyl or an aryl group of the benzene series.

2. The process which comprises polymerizing a mixture of about equal parts by weight of a compound of the group consisting of olefine benzenes and—naphthalenes and homologues thereof and of a ketone of the probable formula:—

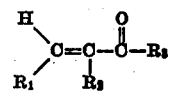

wherein $R_1$ means hydrogen, alkyl or an aryl group of the benzene series, $R_2$ means hydrogen or alkyl and $R_3$ alkyl or an aryl group of the benzene series.

3. The process which comprises heating a mixture of styrene and a ketone of the probable formula:—

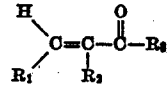

wherein $R_1$ means hydrogen, alkyl or an aryl group of the benzene series, $R_2$ means hydrogen or alkyl and $R_3$ alkyl or an aryl group of the benzene series to a temperature of between about 50 and about 120° C., until polymerization is complete.

4. The process which comprises heating a mixture of about equal parts by weight of styrene and vinyl methylketone to a temperature of between about 50 and about 120° C. until polymerization is complete.

5. The process which comprises heating a mixture of equal parts by weight of styrene and vinyl methyl ketone to 80° C. for 8 days.

6. The artificial resins obtained in accordance with the process claimed in claim 1, said resins being generally colorless to weakly colored compounds, which are more soluble in benzene than the corresponding ketone resins and less brittle than the corresponding olefine benzene—and naphthalene resins.

7. The artificial resins obtained in accordance with the process claimed in claim 2, said resins being generally colorless to weakly colored compounds, which are more soluble in benzene than the corresponding ketone resins and less brittle than the corresponding olefine benzene—and naphthalene resins.

8. The artificial resins obtained in accordance with the process claimed in claim 3, said resins being generally colored to weakly colored compounds, which are more soluble in benzene than the corresponding ketone resins and less brittle than the corresponding styrene resins.

9. The artificial resins obtained in accordance with the process claimed in claim 4, said resins being generally colored to weakly colored compounds, which are more soluble in benzene than the corresponding vinylmethylketone resins and less brittle than the corresponding styrene resins.

10. The artificial resins obtained in accordance with the process claimed in claim 5, said resins being generally colored to weakly colored compounds, which are more soluble in benzene than the corresponding vinylmethylketone resins and less brittle than the corresponding styrene resins.

KURT MEISENBURG.
WALTER BOCK.
OTTO BÄCHLE.